(12) United States Patent
Matsumoto et al.

(10) Patent No.: US 7,916,419 B2
(45) Date of Patent: Mar. 29, 2011

(54) POSTURE ADJUSTMENT METHOD OF MAGNETIC HEAD

(75) Inventors: Masayoshi Matsumoto, Ehime (JP); Shoji Tanaka, Ehime (JP); Ko Shinomori, Ehime (JP)

(73) Assignee: Panasonic Corporation, Osaka (JP)

( * ) Notice: Subject to any disclaimer, the term of this patent is extended or adjusted under 35 U.S.C. 154(b) by 18 days.

(21) Appl. No.: 12/484,524

(22) Filed: Jun. 15, 2009

(65) Prior Publication Data
US 2009/0316293 A1    Dec. 24, 2009

(30) Foreign Application Priority Data
Jun. 23, 2008    (JP) .................................. 2008-162686

(51) Int. Cl.
*G11B 21/02* (2006.01)
*G11B 20/20* (2006.01)
(52) U.S. Cl. .......................... 360/75; 360/76; 360/291.3

(58) Field of Classification Search ........................ None
See application file for complete search history.

(56) References Cited

U.S. PATENT DOCUMENTS
6,335,839 B1 * 1/2002 Yanai ................................ 360/3
7,123,432 B2 * 10/2006 Komai ............................ 360/75

* cited by examiner

*Primary Examiner* — Andrew L Sniezek
(74) *Attorney, Agent, or Firm* — RatnerPrestia

(57) ABSTRACT

A posture adjustment method of a magnetic head is provided. A magnetic head initial position adjustment apparatus measures an initial position of the magnetic head and writes the initial position into an adjustment position information shared apparatus. A magnetic head posture adjustment apparatus reads from the adjustment position information shared apparatus, and information of an adjustment amount given to the magnetic head when the magnetic head is moved and adjusted to a final position is written in the adjustment position information shared apparatus. An adjustment position as a current position of the magnetic head is calculated using the initial position information and the adjustment amount information.

2 Claims, 10 Drawing Sheets

POSTURE ADJUSTMENT METHOD OF MAGNETIC HEAD

TECHNICAL FIELD

The present invention relates to a producing method of a magnetic recording/reproducing apparatus, and more particularly, to a method for adjusting a posture of a magnetic head with respect to a tape surface of the magnetic tape determined by a magnetic tape running mechanism constituted on a base plate of the magnetic recording/reproducing apparatus.

BACKGROUND TECHNIQUE

According to a conventional method for adjusting a posture of a magnetic head, a base plate of a magnetic recording/reproducing apparatus and a carriage having a magnetic head are coupled to each other through several screws, and the screws are rotated, thereby adjusting a relative position between the base plate and the carriage, i.e., a relative position between the magnetic head and a magnetic tape running surface.

In a producing site, a relative initial position between the magnetic head and the magnetic tape running surface is set by adjusting the screws such that a predetermined initial position condition is satisfied. Next, in an adjustment procedure of the relative position between the magnetic head and the magnetic tape running surface, a method in which the adjustment is started from the initial position and the relative position is finely adjusted toward the final position.

In a concrete example, the magnetic head mounted on the magnetic recording/reproducing apparatus is mounted on a voice coil motor. The voice coil motor moves the magnetic head in the vertical direction by a very small distance, and carries out servo adjustment of the magnetic tape running surface. The voice coil motor and its peripheral part are disposed on a pedestal called a carriage, and the pedestal is suspended from the base plate of a magnetic recording apparatus through three screws. It is possible to adjust such that an azimuth angle and a genus angle of the magnetic head fall within predetermined values by adjusting the three screws through which the carriage is suspended. After the carriage is mounted on the base plate, the three screws are appropriately rotated, and the carriage is adjusted to a predetermined initial position while actually measuring the height of the bottom surface of the carriage. To finely adjust the relative position, position information of the magnetic head existing near in the vicinity of the initial position is first obtained from image or the like of a video camera. The azimuth angle and the genus angle are calculated from the image or the like of the video camera, the three screws are appropriately rotated if necessary, and the magnetic head is adjusted toward the final position. When the carriage is constituted from a combination of parts which were machined with standard precision, fine adjustment of most of products can be completed with the above method.

DISCLOSURE OF THE INVENTION

Problem to be Solved by the Invention

According to the above conventional adjustment method, however, when machining precision or design tolerance of each part constituting the magnetic recording/reproducing apparatus are not set to sufficiently level, a range of each screw required for fine adjustment is not sufficient, and with the screw adjustment operation carried out by actual measurement of the carriage height, it is difficult to obtain an adjustment result of the posture of the target magnetic head.

For example, when parts having low machining precision are combined, since errors of the parts are accumulate, the adjustment angle required for fine adjustment of the magnetic head is increased. As a result, the adjustment range of a screw reaches a limit, it becomes impossible to continue the adjustment operation, and the azimuth angle and the genus angle do not fall within the predetermined values. That is, there is a problem that producing yield is deteriorated.

The present invention has been accomplished to solve the above problem, and it is an object of the invention to provide a posture adjustment method of a magnetic head which makes it easy to obtain an adjustment result of a posture of a target magnetic head, to make it possible to continue the adjustment operation, and to enhance the producing yield at the producing site.

Effect of the Invention

According to a posture adjustment method of a magnetic head, initial position information of a carriage obtained by actual measurement is recorded in a file of an adjustment position information shared apparatus, and a magnetic head posture adjustment apparatus accesses the recorded information to carry out a fine adjustment. At that time, displacement of the carriage position obtained by calculation from a rotation amount of the screw at the time of the fine adjustment is recorded. With this, it is possible to manage the current estimated position of the carriage without actually measuring the height of the carriage. With this, it is possible to obtain the adjustment result of the posture of the target magnetic head.

When the screw reaches its moving limit at the time of the fine adjustment, if the screw which reaches the moving limit is rotated in reverse and all of remaining screws are rotated by the same rotation amount so that the carriage moves in parallel without breaking the posture of the entire carriage, it is possible to give the adjustment range leeway. With this, it is possible to maximize the utilization of the adjustable range, and to continue the adjustment operation.

As a result, it is possible to relieve a product which was processed as a defective piece in the process of procedure, and to reduce the production cost.

EXPLANATION OF SYMBOLS

1 magnetic head
2*a*, 2*b*, 2*c* screw
3 carriage adjustment plate
4 base plate
5*a*, 5*b*, 5*c* contact type length measuring machine
6 carriage
7*a*, 7*b*, 7*c* adjustment bit (for magnetic head initial position adjustment apparatus)
8*a*, 8*b*, 8*c* adjustment bit (for magnetic head posture adjustment apparatus)
9 proximity video camera
10 server computer
11 magnetic head initial position adjustment apparatus
12 magnetic head posture adjustment apparatus
13 writing path (for magnetic head initial position adjustment apparatus)
14 reading path (for magnetic head posture adjustment apparatus)
15 writing path (for magnetic head posture adjustment apparatus)
16 file

BEST MODE FOR CARRYING OUT THE INVENTION

A first aspect of the present invention provides a posture adjustment method of a magnetic head of a magnetic recording/reproducing apparatus having a plurality of head moving means capable of suspending the magnetic head from a base plate and moving the magnetic head with respect to the base plate, comprising a magnetic head initial position adjustment apparatus which moves the magnetic head through the head moving means and which adjusts a posture of the magnetic head with respect to the base plate to its initial position, a magnetic head posture adjustment apparatus which moves the magnetic head through the head moving means and which adjusts the posture of the magnetic head with respect to the base plate to its final position, and an adjustment position information shared apparatus in which the magnetic head initial position adjustment apparatus and the magnetic head posture adjustment apparatus commonly possess adjustment position information which is written through a line, wherein the magnetic head initial position adjustment apparatus includes a position measuring step of measuring the initial position of the magnetic head which was moved and adjusted, and a position recording step of writing the measured initial position information into the adjustment position information shared apparatus, and the magnetic head posture adjustment apparatus includes an information obtaining step of reading the initial position information from the adjustment position information shared apparatus, an adjustment amount recording step of writing information of the adjustment amount given to the head moving means by the magnetic head posture adjustment apparatus when the posture of the magnetic head is moved and adjusted to the final position into the adjustment position information shared apparatus, and a position calculating step of calculating an adjustment position of the magnetic head using the initial position information and the adjustment amount information. According to this aspect, it is possible to convert a carriage height (i.e., adjustment position of the magnetic head) as a current position into a numeric value without actually measuring the carriage height, and it is possible to obtain an adjustment result of the posture of a target magnetic head.

According to a second aspect of the invention, in the posture adjustment method of the magnetic head of the first aspect, the magnetic head posture adjustment apparatus includes a step of detecting one of head moving means which reached a moving limit at which movement and adjustment of the magnetic head becomes impossible, and a step of moving the magnetic head which reached the moving limit in an opposite direction after detection, and at the same time, of moving other magnetic head which did not reach the moving limit in the opposite direction, of making adjustment amounts of all of the head moving means equal to each other, and of moving the magnetic head in parallel. According to the second aspect, a gap is provided between the base plate and the magnetic head by the parallel movement of the magnetic heads, it is possible to avoid impossibility to move and adjust, and to continue the adjustment operation.

Embodiment

Figure 1:
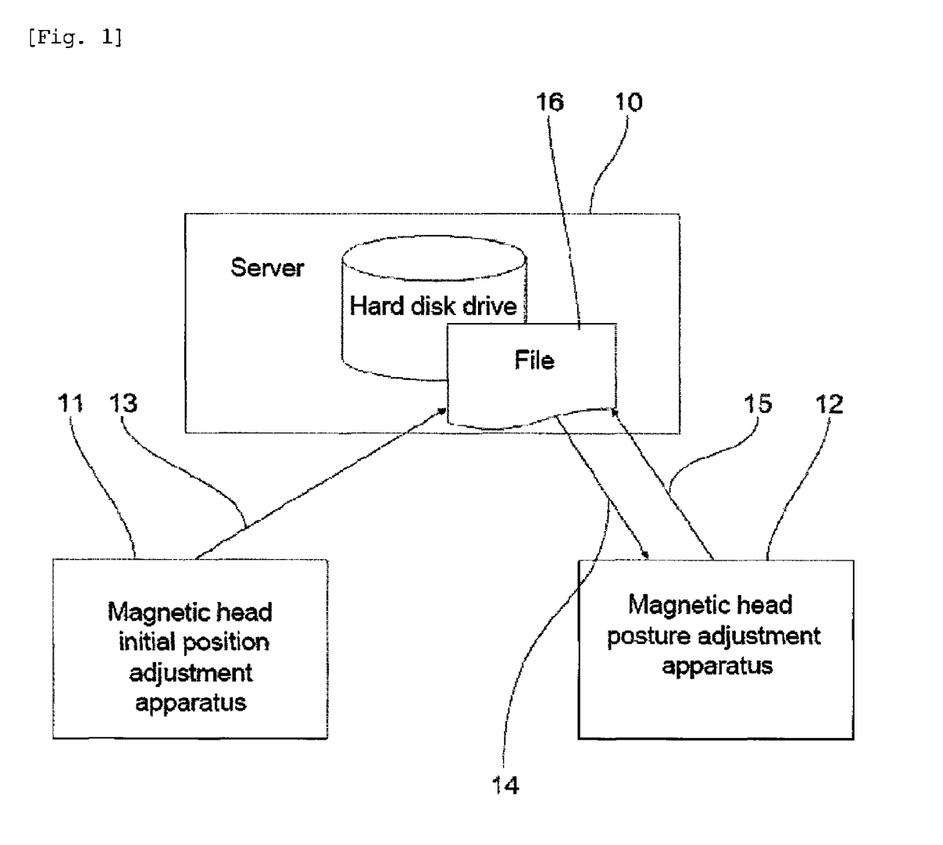
FIG. 1 is a schematic diagram of a posture adjustment system of a magnetic head according to an embodiment of the present invention.

An embodiment of the present invention will be explained with reference to the drawings below. FIG. 1 is a schematic diagram of a posture adjustment system of a magnetic head according to an embodiment of the present invention. That is, FIG. 1 shows a method for adjusting the posture of the magnetic head for a magnetic recording/reproducing apparatus using a posture adjustment system of the magnetic head.

Figure 2:
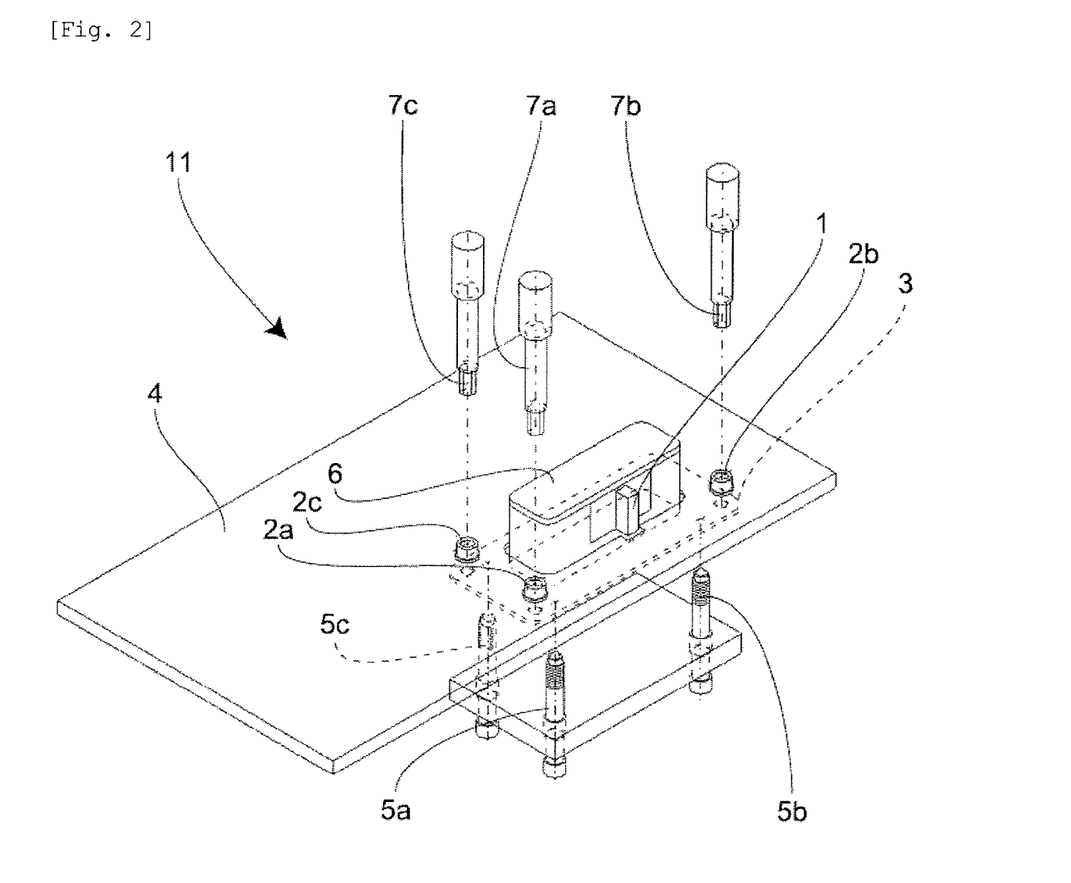
FIG. 2 is a perspective view of a magnetic head initial position adjustment apparatus of the embodiment of the invention.
Figure 3:
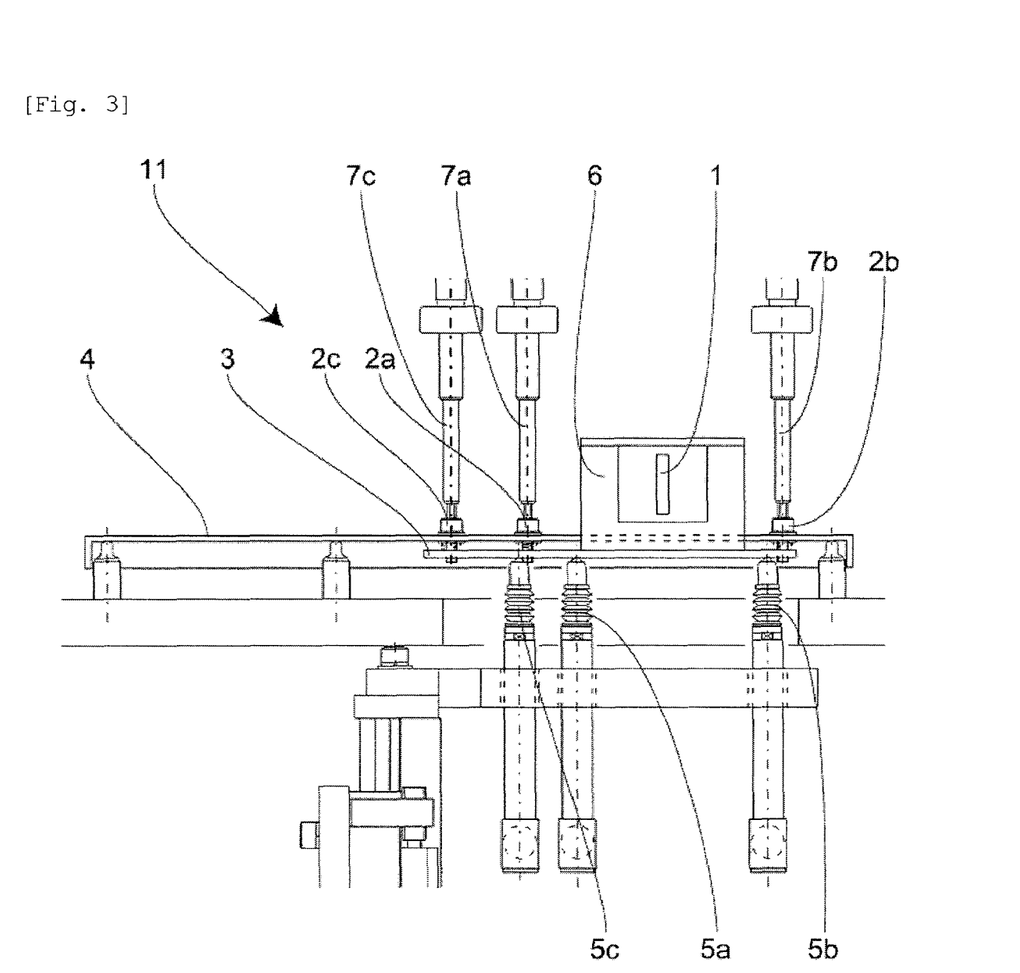
FIG. 3 is a front view of the magnetic head initial position adjustment apparatus shown in FIG. 2.

FIG. 2 is a perspective view of a magnetic head initial position adjustment apparatus of the embodiment of the invention. FIG. 3 is a front view of the magnetic head initial position adjustment apparatus shown in FIG. 2. That is, FIG. 3 shows the magnetic head initial position adjustment apparatus as viewed from front of the magnetic head.

Figure 4:
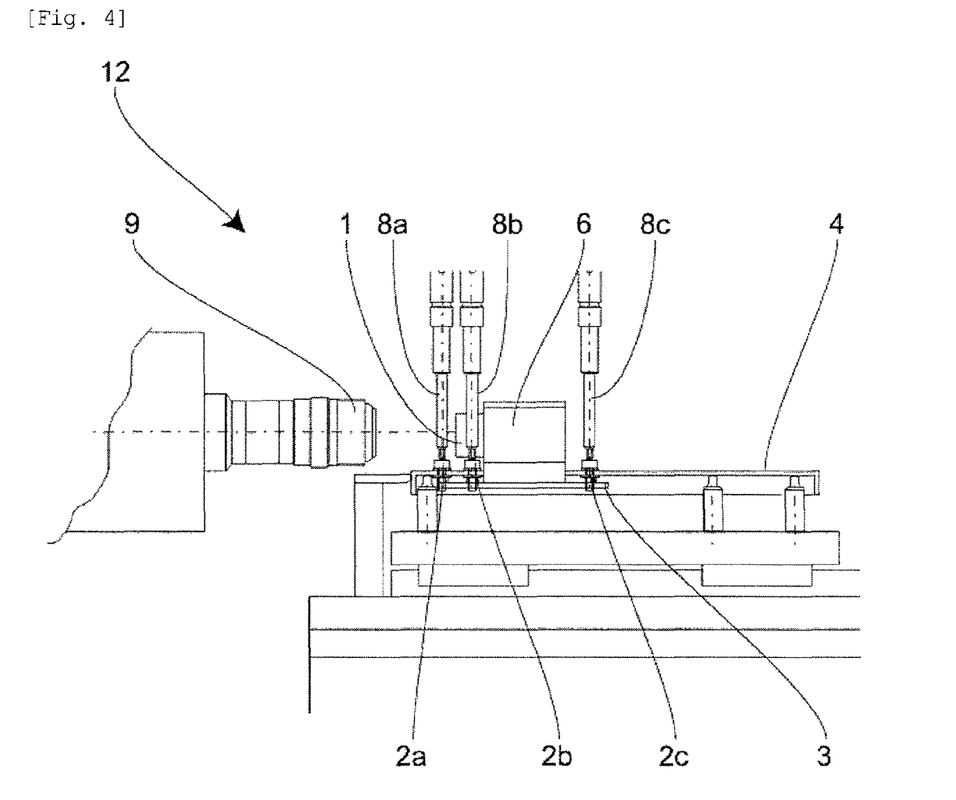
FIG. 4 is a side view of the magnetic head posture adjustment apparatus of the embodiment of the invention.

FIG. 4 is a side view of the magnetic head posture adjustment apparatus of the embodiment of the invention. That is, FIG. 4 shows the magnetic head posture adjustment apparatus as viewed from side of the magnetic head.

Figure 5:
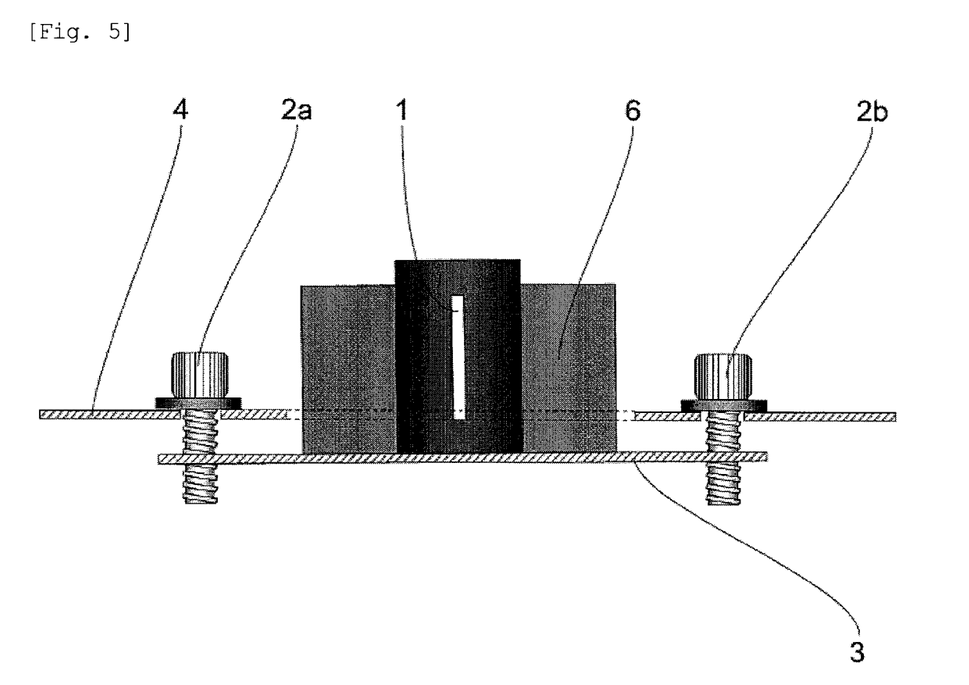
FIG. 5 is a schematic diagram for explaining an adjustment method of the magnetic head posture adjustment apparatus shown in FIG. 4.
Figure 6:
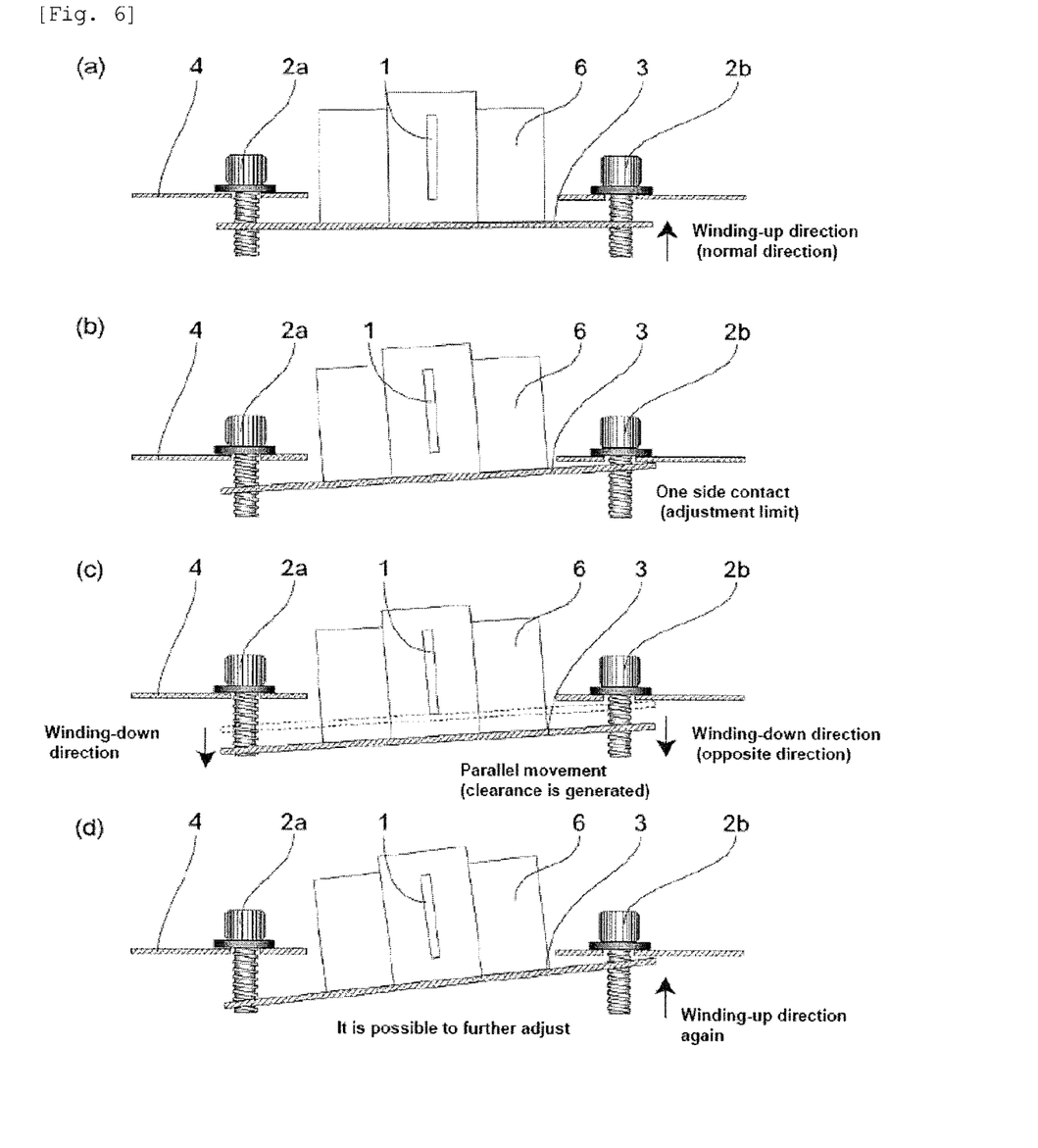
FIG. 6 are schematic diagrams for elaborating on the adjustment method shown in FIG. 5.

FIG. 5 is a schematic diagram for explaining an adjustment method of the magnetic head posture adjustment apparatus shown in FIG. 4. FIG. 6 are schematic diagrams for elaborating on the adjustment method shown in FIG. 5.

The posture adjustment system of the magnetic head shown in FIG. 1 includes an adjustment position information shared apparatus 10 such as a server computer (server computer 10, hereinafter), a magnetic head initial position adjustment apparatus 11 and a magnetic head posture adjustment apparatus 12.

In the magnetic head initial position adjustment apparatus 11, initial position information of the obtained magnetic head is written and stored on a file 16 in a recording apparatus in the server computer 10.

In the magnetic head posture adjustment apparatus 12, a displacement amount (i.e., adjustment amount) when the posture of the magnetic head is adjusted is added to or subtracted from the initial position information of the magnetic head, thereby appropriately obtaining adjustment position information of the magnetic head and recording the same.

That is, after the magnetic head is mounted on the magnetic recording/reproducing apparatus, the initial position information of the magnetic head determined by the magnetic head initial position adjustment apparatus 11 is converted into a numeric value in the magnetic head initial position adjustment apparatus 11. The initial position information is shared by the server computer 10 together with the adjustment amount obtained by the magnetic head posture adjustment apparatus 12.

In the magnetic head initial position adjustment apparatus 11, since it is necessary to precisely determine the initial position of the magnetic head, the initial position of the magnetic head is adjusted while measuring the current position of the magnetic head also by a video camera image or a length measuring machine. Since the initial position is obtained as a numeric value in any of the measuring methods, the numeric value is written on the file 16 which is freely determined in the server computer 10 on a network.

Next, a magnetic recording/reproducing apparatus which completed the adjustment of the initial position of the magnetic head by the magnetic head initial position adjustment apparatus 11 is set on the magnetic head posture adjustment apparatus 12. Then, the initial position information of the magnetic head of the magnetic recording/reproducing apparatus which was written into the server computer 10 on the network by the magnetic head initial position adjustment apparatus 11 is read, and the fine adjustment is carried out.

In the magnetic head posture adjustment apparatus 12, adjustment amount (i.e., adjustment amount of a later-described screw) carried out at the time of the fine adjustment is obtained by calculation from a moving amount of an actuator (i.e., later-described adjustment bit) operated when the adjustment is carried out. The adjustment amount is held by adding it to or subtracting it from the initial position information of the magnetic head. After the adjustment is completed, it is written into the file 16 which was freely set in the server computer 10 on the network, and the adjustment is completed. With this above operation, it is possible to appropriately obtain the adjustment position information as the current position of the magnetic head.

Figure 7:
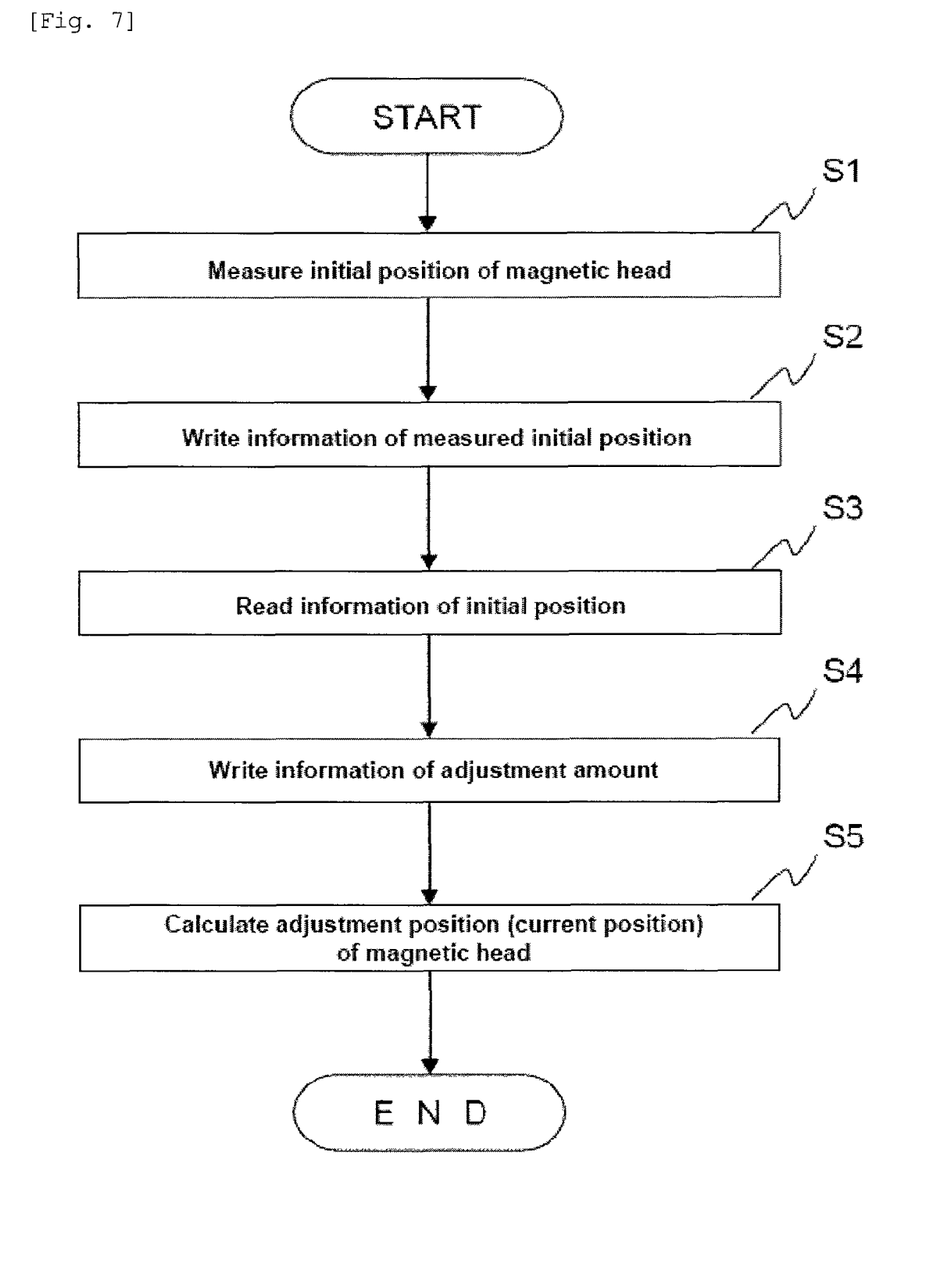
FIG. 7 is a flowchart of the posture adjustment method of the magnetic head of the embodiment of the invention.

Here, the posture adjustment method of the magnetic head will be explained. FIG. 7 is a flowchart of the posture adjustment method of the magnetic head of the embodiment of the invention.

First, in step 1, in the magnetic head initial position adjustment apparatus 11, the posture of the magnetic head is moved and adjusted to the initial position through head moving means, and the initial position is measured by the length measuring machine or the like. In step 2, in the magnetic head initial position adjustment apparatus 11, the measured initial position information is written in the server computer 10.

In step 3, in magnetic head posture adjustment apparatus 12, the initial position information is read from the server computer 10. In step 4, in the magnetic head posture adjustment apparatus 12, when the posture of the magnetic head is moved and adjusted to the final position through the head moving means, information of the adjustment amount given to the head moving means by the magnetic head posture adjustment apparatus 12 is written in the server computer 10.

In step 5, in the magnetic head posture adjustment apparatus 12, an adjustment position as the current position of the magnetic head is calculated using the initial position information and the adjustment amount information.

The magnetic head initial position adjustment apparatus and the magnetic head posture adjustment apparatus will be explained below.

The magnetic head initial position adjustment apparatus 11 shown in FIGS. 2 and 3 includes a head portion (i.e., a magnetic head 1, a carriage 6, three screws 2a, 2b and 2c, a carriage adjustment plate 3 and a base plate 4) of the magnetic recording/reproducing apparatus which is set for adjustment by the magnetic head initial position adjustment apparatus 11, three contact type length measuring machines 5a, 5b and 5c, and three adjustment bits 7a, 7b and 7c. The three screws 2a, 2b and 2c are the above-described head moving means, and the three adjustment bits 7a, 7b and 7c are the above-described actuators.

When measurement results measured by the three contact type length measuring machines 5a, 5b and 5c do not fall within predetermined values, the three adjustment bits 7a, 7b and 7c are inserted into corresponding three screws 2a, 2b and 2c, respectively, and the screws are rotated. The position of the carriage adjustment plate 3 is moved so that the measured values of the three contact type length measuring machines 5a, 5b and 5c fall within the predetermined values.

In FIGS. 2 to 3, the magnetic head 1 is a general magnetic recording/replaying head in a magnetic recording/reproducing apparatus when the information recording medium is a tape, and the magnetic head 1 can be moved to any position with respect to a width direction of the tape of the magnetic tape running surface by a mechanism possessed by the carriage 6.

The magnetic head 1 and the carriage 6 are provided on the carriage adjustment plate 3, and the carriage adjustment plate 3 is suspended from the base plate 4 through the three screws 2a, 2b and 2c.

The contact type length measuring machines 5a, 5b and 5c re general measuring machines for measuring the height of a lower surface of the carriage adjustment plate 3, and the height is measured in the vicinity of the three screws 2a, 2b and 2c, respectively.

The three adjustment bits 7a, 7b and 7c respectively correspond to the three screws 2a, 2b and 2c, and the carriage adjustment plate 3 can vertically be moved by rotating any of the three screws 2a, 2b and 2c by a necessary amount.

The magnetic head posture adjustment apparatus 12 shown in FIG. 4 includes the head portion (i.e., the magnetic head 1, the carriage 6, the three screws 2a, 2b and 2c, the carriage adjustment plate 3 and the base plate 4) of the magnetic recording/reproducing apparatus which is set for adjustment by the magnetic head posture adjustment apparatus 12, the three adjustment bits 8a, 8b and 8c and a proximity video camera 9 having image processing function.

The inclination angle of the magnetic head 1 is calculated based on an image taken by the proximity video camera 9. When the inclination angle does not fall within a predetermined value, the three adjustment bits 8a, 8b and 8c are inserted into the corresponding three screws 2a, 2b and 2c, respectively, and the screws are rotated. The position of the carriage adjustment plate 3 is moved so that the inclination angle of the magnetic head 1 by the image of the proximity video camera 9 falls within a predetermined value.

Next, a principle of the posture adjustment method of the magnetic head according to the embodiment will be explained with reference to the drawings.

It is an object of the magnetic head initial position adjustment apparatus 11 shown in FIG. 3 to initially set a relative distance between the magnetic head 1 and the base plate 4 and the inclination of the magnetic head 1. That is, by adjusting the relative distance between the carriage adjustment plate 3 and the base plate 4, the initial position of the magnetic head 1 is easily obtained.

A bottom surface of the carriage adjustment plate 3 is measured by the three contact type length measuring machines 5a, 5b and 5c. A difference between the calculated value obtained by calculating the measured value and a predetermined value of the predetermined initial position is obtained. The difference is reflected as a rotation amount for adjustment next to the three adjustment bits 7*a*, 7*b* and 7*c*, i.e., as adjustment amounts of the screws which are to be rotated.

Next, the three screws 2*a*, 2*b* and 2*c* corresponding to the three adjustment bits 7*a*, 7*b* and 7*c* are rotated, and the measurement is carried out by the three contact type length measuring machines 5*a*, 5*b* and 5*c*. The adjustment operation is repeated until the difference between the calculated value obtained by calculating the measured value and the predetermined value of the predetermined initial position fall within the predetermined value. When the adjustment operation is completed, the calculated value measured by the three contact type length measuring machines 5*a*, 5*b* and 5*c* and obtained by the calculation is stored in the file 16 in the server computer 10 shown in FIG. 1 through a writing path (line) 13.

Figure 8:
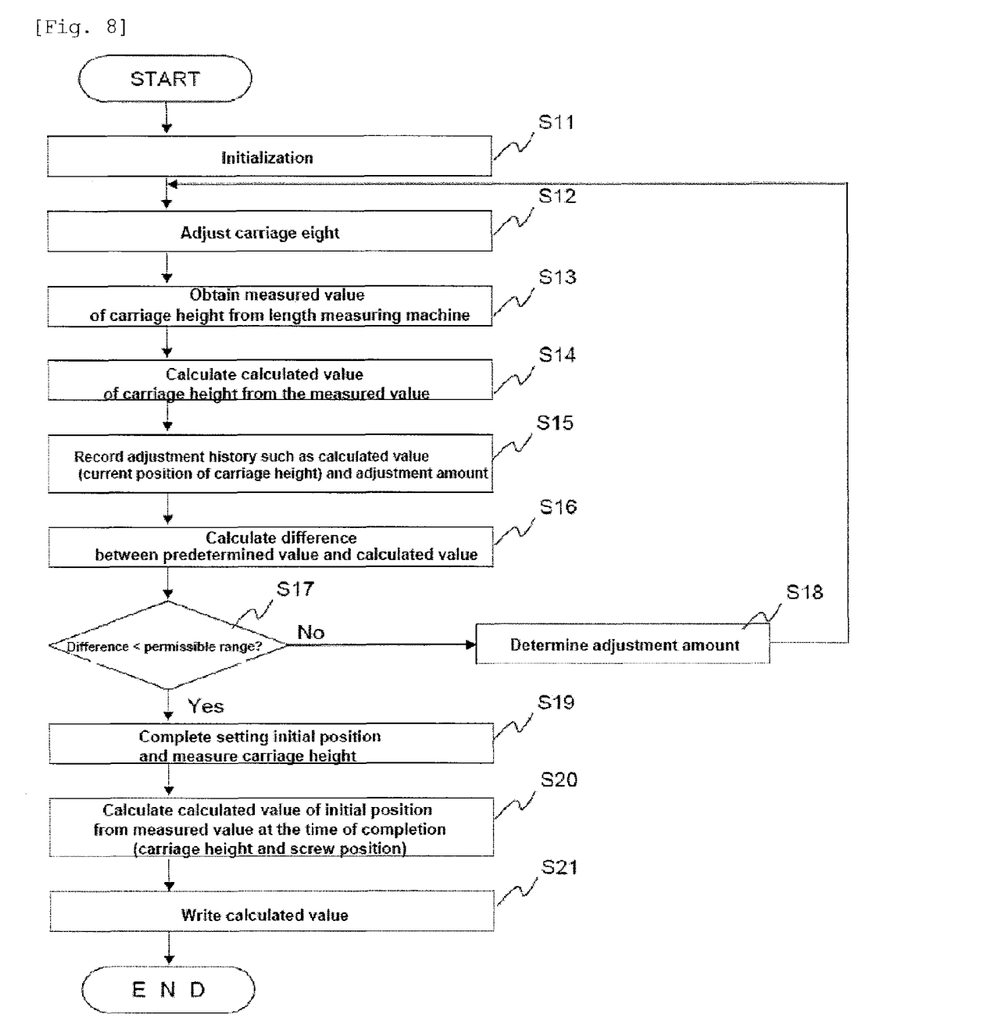
FIG. 8 is a flowchart of a method for adjusting the initial position of the magnetic head of the embodiment of the invention.

Here, the adjustment method of the initial position of the magnetic head will be explained. FIG. 8 is a flowchart of a method for adjusting the initial position of the magnetic head of the embodiment of the invention.

First, in step 11, initialization is carried out. That is, a predetermined value of a height of the carriage, a permissible range, first adjustment amount of each screw (adjustment amount of the carriage height by first rotating the screw) are set. In step 12, in the first adjustment amount or adjustment amount (adjustment amount of the carriage height by rotating the screw after the second time), the screws are rotated and the carriage height is adjusted.

In step 13, a measured value of the carriage bottom surface measured by the length measuring machine is obtained. In step 14, a calculated value of the carriage height is calculated from the measured value. In step 15, the calculated value is stored as current position information of the carriage height, and an adjustment amount of each time is stored. That is, an adjustment history is written in the file 16.

In step 16, a difference between the calculated value and the predetermined value is calculated. In step 17, it is determined whether the difference is within a permissible range. If the difference is not within the permissible range, the procedure is advance to step 18, the difference is reflected and the adjustment amount is calculated and determined. The adjustment history may be utilized. Then, the procedure is returned to step 12, and the adjustment operation is repeated.

If the difference is within the permissible range, the setting of the initial position is completed in step 19, and the height of the bottom surface of the carriage is measured. In step 20, the calculated value of the carriage height is calculated from the measured value at the time of completion of the setting. In step 21, the calculated value at the time of the completion is written as the initial position information of the magnetic head. The adjustment history is also written.

It is an object of the magnetic head posture adjustment apparatus 12 shown in FIG. 4 to analyze an image taken by the proximity video camera 9 (or optical microscope), and to strictly adjust a relative distance between the magnetic head 1 and the base plate 4 and the inclination of the magnetic head 1.

From the file 16 in the server computer 10 shown in FIG. 1, initial position information is read through a reading path (line) 14, and current positions of the carriage adjustment plate 3 and the three screws 2*a*, 2*b* and 2*c* are obtained.

Since the carriage adjustment plate 3 is adjusted to the predetermined initial position by the magnetic head initial position adjustment apparatus 11, it is relatively easy to specify the place of the magnetic head 1 by the proximity video camera 9 provided on the magnetic head posture adjustment apparatus 12.

The inclination angle of the magnetic head 1 is obtained by an imaged obtained by the proximity video camera 9, the three adjustment bits 8*a*, 8*b* and 8*c* are operated if necessary, and the three screws 2*a*, 2*b* and 2*c* are rotated. With this, the carriage adjustment plate 3 is modified to any inclination. That is, the carriage adjustment plate 3 can be adjusted. At the same time, the inclination angle of the magnetic head 1 can also be modified.

At the time of the adjustment, variations in positions generated in the three screws 2*a*, 2*b* and 2*c* and the carriage adjustment plate 3 are obtained by calculation of rotation amounts of the three adjustment bits 8*a*, 8*b* and 8*c* (i.e., adjustment amount given to the screws 2*a*, 2*b* and 2*c* by the magnetic head posture adjustment apparatus 12). Position information is written into the file 16 in the server computer 10 through the writing path (line) 15.

Since the adjustment amount in the magnetic head posture adjustment apparatus 12 is written in the file 16 in the server computer 10, the current positions of the three screws 2*a*, 2*b* and 2*c* and the carriage adjustment plate 3 can always be grasped.

Figure 9:
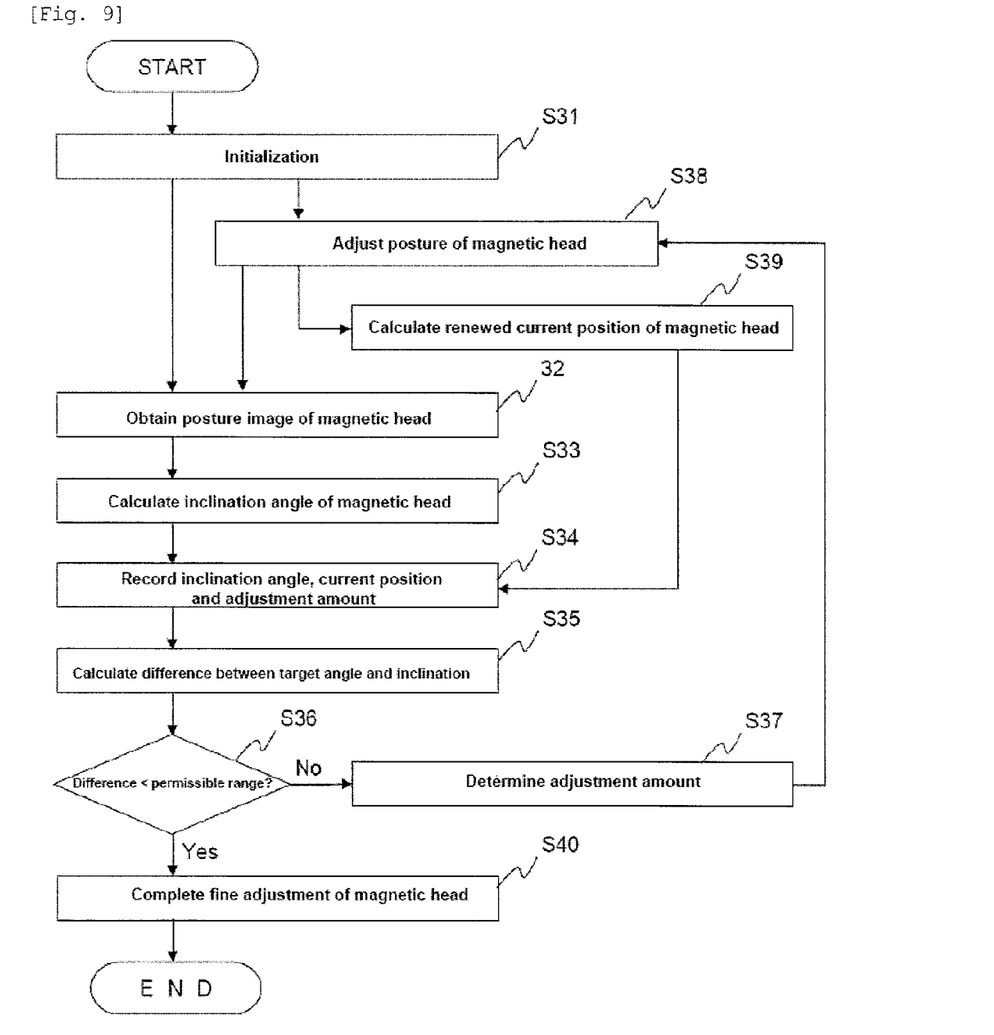
FIG. 9 is a flowchart of a method for finely adjusting the posture of the magnetic head of the embodiment of the invention.

The fine adjustment method of the posture of the magnetic head will be explained. FIG. 9 is a flowchart of a method for finely adjusting the posture of the magnetic head of the embodiment of the invention.

In step 31, the initialization is carried out. That is, adjustment history such as the initial position information of the magnetic head and the current position is read, and the inclination angle of the target magnetic head (target angle, hereinafter) and the permissible range are input. By the initialization in step 31, the posture of the magnetic head is adjusted (step 38). In step 32, an image of the posture of the magnetic head is obtained from a video camera.

In step 33, the obtained image is analyzed and the inclination angle of the magnetic head is calculated. In step 34, the inclination angle calculated. At that time, in step 39, the renewed current position and the adjustment amount of each time are also recorded. That is, the adjustment history is written in the file 16.

In step 35, a difference between the target angle and the inclination angle is calculated. In step 36, it is determined whether the difference is within the permissible range. When the difference is not within the permissible range, the procedure is advanced to step 37, and the adjustment amount is determined by reflecting and calculating the difference. The adjustment history may be utilized. Then, the procedure is advanced to step 38, the adjustment bit is operated with the determined adjustment amount, the screws are rotated, and the posture of the magnetic head is adjusted. Further, the procedure is returned to step 32, and the adjustment operation is repeated.

The procedure is advanced from step 38 to step 39, the current position and the adjustment amount are calculated, and the renewed current position of the magnetic head is calculated.

When the difference is within the permissible range, the fine adjustment of the magnetic head is completed in step 40.

As shown from FIG. 2 to FIG. 5, all of the magnetic head 1, the carriage 6, the three screws 2*a*, 2*b* and 2*c* and the carriage adjustment plate 3 are provided on the base plate 4, and the movement during the adjustment steps is carried out together with the base plate 4. In other words, it is possible to prevent the posture of the head portion of the magnetic recording/reproducing apparatus from being changed during the setting operation in the magnetic head initial position adjustment apparatus 11 and during the fine adjustment operation in the magnetic head posture adjustment apparatus 12.

When the inclination angle of the magnetic head is adjusted to the target angle, one of the three screws reaches a limit of the adjustable range before the inclination angle reaches the target angle, and it becomes impossible to adjust in some cases. A countermeasure method for such a case will be explained using FIGS. 5 and 6.

An adjustment amount of an inclination angle which is necessary in accordance with an inclination angle of the magnetic head 1 can be given to the carriage adjustment plate 3 by rotating two of the screws 2a and 2b. The adjustment operation of the inclination is started from a position determined by the magnetic head initial position adjustment apparatus 11.

In FIGS. 5 and 6(*a*) for example, the screw 2b is rotated in a winding-up direction in correspondence with the inclination angle of the magnetic head 1. The winding-up direction is a direction in which the carriage adjustment plate 3 and the base plate 4 approach each other.

Assuming that the inclination angle of the magnetic head 1 is sufficiently large, the carriage adjustment plate 3 and the base plate 4 come into contact on the side where the screw 2b is disposed, and the inclination angle of the magnetic head 1 does not fall within the predetermined range in some cases (state shown in FIG. 6(*b*)). In a normal adjustment method, it is recognized that the adjustment can not be carried out at this point in time.

It is detected that the movement reaches its limit at which the movement and adjustment can not be carried out, and the two screws 2a and 2b are moved in a winding-down direction opposite from the winding-up direction by the same amount at the same time.

With this, since the carriage adjustment plate 3 moves in parallel in a direction away from the base plate 4. At that time, the magnetic head 1 also moves in parallel in the same direction as the carriage adjustment plate 3, this does not exert an influence upon the inclination angle of the magnetic head 1. On the side of the screw 2b, a clearance is newly provided between the carriage adjustment plate 3 and the base plate 4 (state shown in FIG. 6(*c*)).

Therefore, it becomes possible to continue the adjustment operation of the inclination angle of the magnetic head 1 using the normal adjustment method. With this parallel movement, a state in which, on the side of the screw 2a, the carriage adjustment plate 3 reaches the lower limit position of the screw 2a and the carriage adjustment plate 3 reaches a position where the carriage adjustment plate 3 and, on the side of the screw 2b, the base plate 4 again come into contact with each other becomes the maximum adjustment range of the adjustment operation (state shown in FIG. 6(*d*)).

If this adjustment method is used, it becomes possible to continue the adjustment of the inclination angle of the magnetic head 1 until the range reaches the maximum adjustment range.

Figure 10:
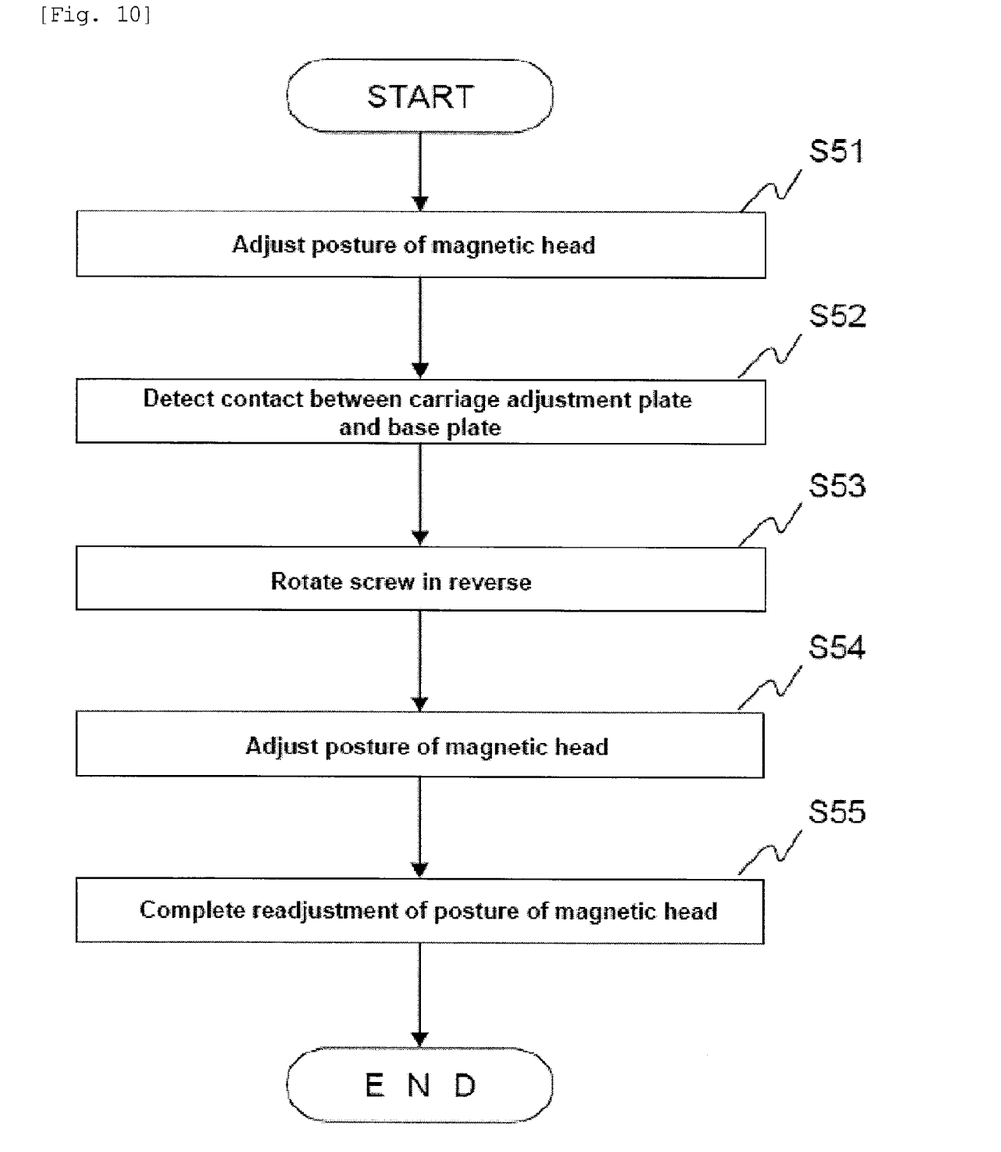
FIG. 10 is a flowchart of a method for widening an adjustable range of the magnetic head of the embodiment of the invention.

A method for widening the adjustable range will be explained. FIG. 10 is a flowchart of a method for widening the adjustable range of the magnetic head of the embodiment of the invention.

First, in step 51, the screws 2a, 2b and 2c are rotated, the carriage adjustment plate 3 is moved and the posture of the magnetic head 1 is adjusted. That is, the height and inclination of the carriage are adjusted. Then, in step 52, contact between the carriage adjustment plate 3 and the base plate 4 is detected. By this detection, one of the screws (2a, for example) which reached the moving limit at which the carriage adjustment plate 3 can not move is found. In step 53, the screw 2a which reached the moving limit is rotated in reverse and at the same time, the other screws 2b and 2c are also rotated in reverse. The adjustment amounts of the screws 2a, 2b and 2c at the time of the reverse rotation should be the same. The carriage adjustment plate 3 is moved in parallel, and a gap is created between the carriage adjustment plate 3 and the base plate 4.

In step 54, the screw (2a) which reached the moving limit is rotated in the original direction, the carriage adjustment plate 3 is moved, and the posture of the magnetic head 1 is again adjusted. In step 55, the readjustment of the posture of the magnetic head 1 is completed.

INDUSTRIAL APPLICABILITY

As described above, according to the posture adjustment method of a magnetic head of the present invention, it is possible to easily adjust, within a short period of time, a product which could not be adjusted according to the conventional technique. The present invention can be applied to a posture adjustment method which utilizes a general and existing network machine, a measuring machine and an existing adjustment algorithm.

The invention claimed is:

1. A posture adjustment method of a magnetic head of a magnetic recording/reproducing apparatus having a plurality of head moving means capable of suspending the magnetic head from a base plate and moving the magnetic head with respect to the base plate, the method comprising:
    moving, by a magnetic head initial position adjustment apparatus, the magnetic head through the head moving means and adjusting a posture of the magnetic head with respect to the base plate to an initial position,
    moving, by a magnetic head posture adjustment apparatus, the magnetic head through the head moving means and adjusting the posture of the magnetic head with respect to the base plate to a final position, and
    writing, to an adjustment position information shared apparatus, adjustment position information, the adjustment position information being shared by the magnetic head initial position adjustment apparatus and the magnetic head posture adjustment apparatus, wherein:
    the step of moving the magnetic head by the magnetic head initial position adjustment apparatus includes:
        a position measuring step of measuring the initial position of the magnetic head which was moved and adjusted, and
        a position recording step of writing the measured initial position information into the adjustment position information shared apparatus, and
    the step of moving the magnetic head by the magnetic head posture adjustment apparatus includes:
        an information obtaining step of reading the initial position information from the adjustment position information shared apparatus,
        an adjustment amount recording step of writing information of the adjustment amount given to the head moving means by the magnetic head posture adjustment apparatus when the posture of the magnetic head is moved and adjusted to the final position into the adjustment position information shared apparatus, and
        a position calculating step of calculating an adjustment position of the magnetic head using the initial position information and the adjustment amount information.

2. The posture adjustment method of the head moving means according to claim 1, wherein:
    the magnetic head is provided on a carriage adjustment plate, the carriage adjustment plate being suspended from the base plate through the plurality of head moving means, in the magnetic head posture adjustment apparatus, the magnetic head is moved by the plurality of head moving means, and the method includes:

if the carriage adjustment plate and the base plate come into contact when the magnetic head is moved, moving the carriage adjustment plate in parallel in a direction away from the base plate to move all of the plurality of head moving means by a same amount.

* * * * *